US007401033B2

(12) United States Patent
Al-Azzawe

(10) Patent No.: US 7,401,033 B2
(45) **Date of Patent: *Jul. 15, 2008**

(54) E-COMMERCE ACTIVITY LOG

(75) Inventor: Abdul Al-Azzawe, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 627 days.

This patent is subject to a terminal disclaimer.

(21) Appl. No.: 10/144,410

(22) Filed: May 10, 2002

(65) Prior Publication Data

US 2003/0212612 A1 Nov. 13, 2003

(51) Int. Cl.
*G06Q 30/00* (2006.01)

(52) U.S. Cl. .......................................... 705/26; 705/37

(58) Field of Classification Search .................... 705/26
See application file for complete search history.

(56) References Cited

U.S. PATENT DOCUMENTS 5,392,387 A 2/1995 Fitzpatrick et al. .......... 715/776
5,500,929 A 3/1996 Dickinson ................... 715/853
5,515,488 A 5/1996 Hoppe et al. ................ 345/440
5,559,946 A 9/1996 Porter ........................ 715/781
5,563,994 A 10/1996 Harmon et al. ............. 345/440
5,590,264 A 12/1996 Keane et al. ................ 715/838
5,613,113 A 3/1997 Goldring
5,621,880 A 4/1997 Johnson ...................... 395/326
5,818,449 A 10/1998 Myers ........................ 345/343
5,960,411 A * 9/1999 Hartman et al. ............... 705/26
5,974,572 A 10/1999 Weinberg et al. ............. 714/47
6,049,334 A 4/2000 Bates et al. ................. 345/332
6,064,384 A 5/2000 Ho ............................ 345/350
6,073,108 A 6/2000 Peterson ........................ 705/8
6,119,101 A 9/2000 Peckover
6,192,378 B1 2/2001 Abrams et al.
6,219,676 B1 4/2001 Reiner (Continued)

FOREIGN PATENT DOCUMENTS

EP 1026608 8/2000

(Continued)

OTHER PUBLICATIONS

Al-Azzxwe, IBM Video Online for e-Business, Apr. 10, 2002, downloeaded form the Internet on Apr. 20, 2006, 11 pages.*

(Continued)

*Primary Examiner*—James Zurita
(74) *Attorney, Agent, or Firm*—Sawyer Law Group LLP

(57) ABSTRACT

An activity log is displayed in a dedicated area in a business to consumer e-commerce web site that tracks activities that occur during a current e-commerce account session. The activity log is updated automatically, without requiring user intervention. The activity log displays information such as the activity type, the activity name, and the time the activity was performed. The activity log may also provide an option for the user to view details about or to undo an individual activity. The activity log tracks activities that would conventionally be lost from view, such as the removal of items from a list and the changing of the password. In addition, the activity log automatically displays updates that are not conventionally available, such as greater granularity in the status of an asynchronous transaction.

6 Claims, 3 Drawing Sheets

100
102
104
106
108
Activity Type, Activity Data, Time — Details
Reserved Movie 1 at 10:35 am — Details — 112
Added Movie 1 to wish list at 9:30 am — Details — 110
Removed Movie 2 from wish list at 9:26 am — Details — 114
Changed password at 9:17 am — Details — 116
Current status of asynchronous activity — Details
Current status of synchronous activity — Details
Authenticating User ID and password — Details
118
MOVIE WISH LIST
Movie 1
Movie 2

U.S. PATENT DOCUMENTS

| | | | | |
|---|---|---|---|---|
| 6,489,971 | B1 | 12/2002 | Miller et al. | 715/763 |
| 6,493,743 | B2 | 12/2002 | Suzuki | 709/203 |
| 6,496,202 | B1 | 12/2002 | Prinzing | 715/762 |
| 6,501,490 | B1 | 12/2002 | Bell | 715/837 |
| 6,509,912 | B1 | 1/2003 | Moran et al. | 715/762 |
| 6,938,219 | B2 | 8/2005 | Al-Azzawe et al. | 715/854 |
| 2002/0042750 | A1 * | 4/2002 | Morrison | 705/26 |
| 2003/0204449 | A1 * | 10/2003 | Kotas et al. | 705/27 |

FOREIGN PATENT DOCUMENTS

| | | |
|---|---|---|
| JP | 9325878 | 12/1997 |

OTHER PUBLICATIONS

"Microvision and Gallion Partner to :Explore Gate-to-Gate Air Traffic Control Display Solutions", PR Newswire. New York: Feb. 19, 2001. p. 1, downloaded from ProQuest Direct on the web on Oct. 17, 2007.*

Bock, Geoffrey E., "Creating the Network Hub for Electronic Trading Communities," E-Business Strategies & Solutions/Product Review, Patricial Scybold Group E-Business Strategies & Solutions, Sep. 15, 1999, pp. 43-49.

Elvers, Lita M., "Selling's Latest Secret Weapon," Sales & Marketing Management, vol. 13J, No. 8, Dec. 3, 1984, pp. 64-66.

Choo, Chun W. et al. A Behavioral Model of Information Seeking on the Web Preliminary Results of a Study of How Managers andIT Specialists Use the Web, Proceedings of the 61st ASIS Annual Meeting, Pittsburg, PA, Oct. 24-29, 1998, pp. 290-302.

Liu, Chen-Chung et al., "Managing Activity Dynamics of Web Based Collaborative Applications," International Journal on Artificial Intelligence Tools, pp. 1-21.

* cited by examiner

E-COMMERCE ACTIVITY LOG

RELATED APPLICATIONS

The present application is related to co-pending U.S. patent application, titled "Method and System For Displaying Actions and Historical Content in an Output View", Ser. No. 10/056,559, filed on Jan. 27, 2002, assigned to the assignee of the present application.

FIELD OF THE INVENTION

The present invention relates to electronic commerce networks, and more particularly to the display of activities during an electronic commerce session.

BACKGROUND OF THE INVENTION

E-commerce or on-line commerce is well known in the art. Typically a consumer user accesses an e-commerce business through a web site. Typically, the user has an account with the e-commerce business, and may access the account by logging in with his/her user identification (ID) and password. This initiates an e-commerce account session. During the current e-commerce account session, the user may modify their online account directly or indirectly. These activities may include ordering items for purchase or rent, rating or reviewing items, and account information updates, etc.

However, the conventional tracking of these activities is limited and inflexible. Online users are unable to automatically obtain updates on the activities made during the e-commerce account session. For example, the user places an order by putting an item in a "shopping cart". A list of items in the shopping cart may then be viewed. Typically, a status of "pending" or "shipped" is displayed. However, multiple tasks are performed at the back end between the "pending" and "shipped" states, none of which are displayed to the user. Thus, the user has limited information concerning the status of the order. In addition, the user typically must manually access the shopping cart to determine if the status of the order has changed. For another example, the user removes an item in the shopping cart. Once this item has been removed, it is no longer displayed. No further data concerning this removal is available. The user is not able to track removed items and cannot undo the removal. Instead, the item must be added again to the shopping cart.

This manner of tracking activities during a current e-commerce account session is limited and inflexible, and is cumbersome for the user. As the complexity and variety of services provided by online businesses increase, the burden on the user increases as well.

Accordingly, there exists a need for an improved method and system for displaying activities during a current e-commerce account session. The method and system should automatically display and update account modifications so as to allow a user to review the modifications and undo them when desired. The present invention addresses such a need.

SUMMARY OF THE INVENTION

An activity log is displayed in a dedicated area in a business to consumer e-commerce web site that tracks activities that occur during a current e-commerce account session. The activity log is updated automatically, without requiring user intervention. The activity log displays information such as the activity type, the activity name, and the time the activity was preformed. The activity log may also provide an option for the user to view details about or to undo an individual activity. The activity log tracks activities that would conventionally be lost from view, such as the removal of items from a list and the changing of the password. In addition, the activity log automatically displays updates that are not conventionally available, such as greater granularity in the status of an asynchronous transaction.

DETAILED DESCRIPTION

The present invention provides an improved method and system for displaying activities during a current e-commerce account session. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The method and system in accordance with the present invention displays an activity log in a dedicated area in a business to consumer e-commerce web site that tracks activities that occur during a current e-commerce account session. The activity log is updated automatically, without requiring user intervention. The activity log displays information such as the activity type, the activity name, and the time the activity was performed. The activity log may also provide an option for the user to view more details about and to undo an individual activity.

To more particularly describe the features of the present invention, please refer to FIGS. 1 through 3 in conjunction with the discussion below.

Figure 1:
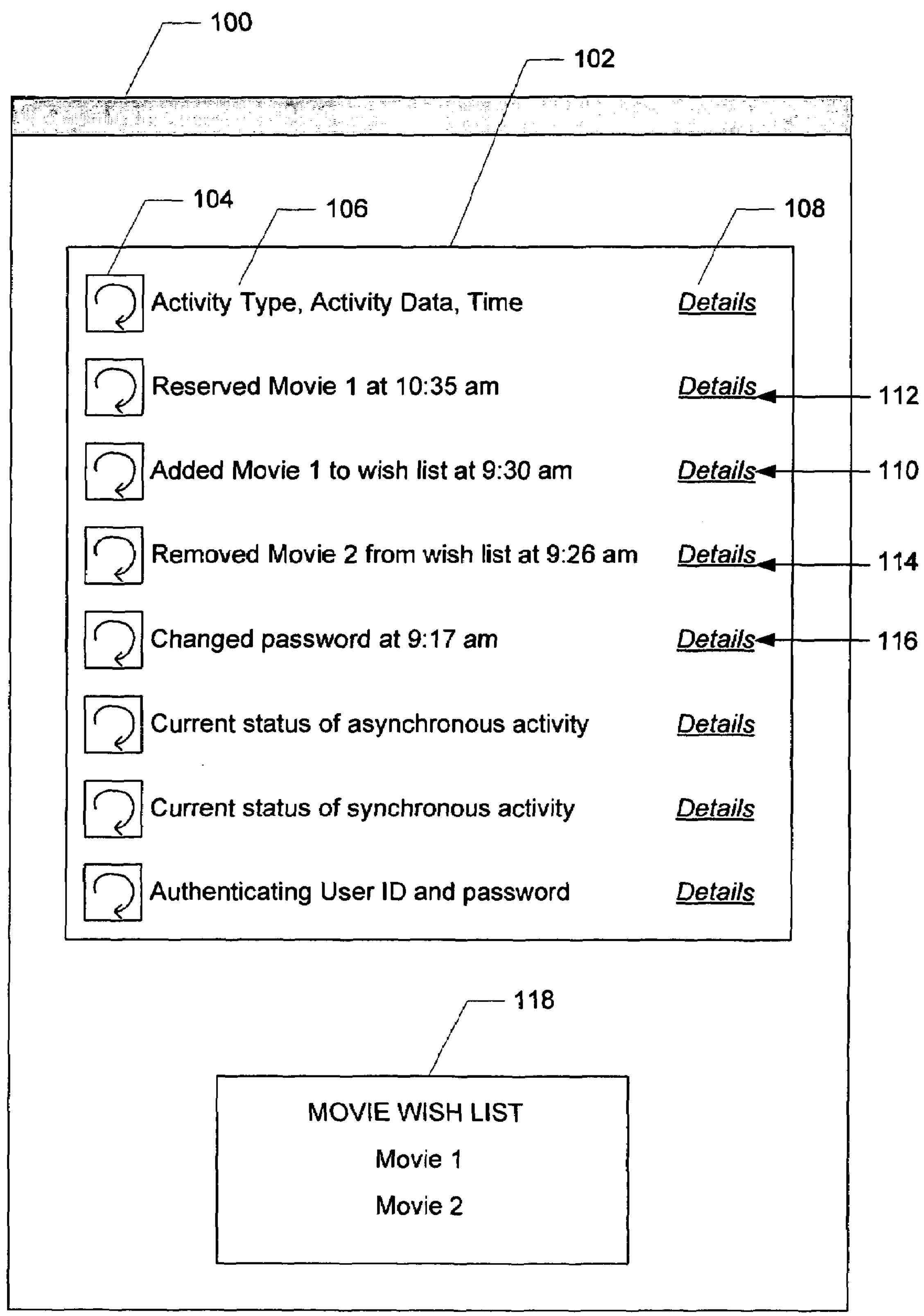
FIG. 1 illustrates a preferred embodiment of an activity log for displaying activities during a current e-commerce account session in accordance with the present invention.

FIG. 1 illustrates a preferred embodiment of an activity log for displaying activities during a current e-commerce account session in accordance with the present invention. A business to consumer e-commerce web site 100 comprises a dedicated area for an activity log 102 in accordance with the present invention. The activity log 102 displays a list of activities that has occurred during the current e-commerce account session. In the preferred embodiment, the list comprises an "undo" button 104 for each activity, information 106 concerning each activity, and a link 108 to view additional details for each activity. Alternatively, some select details, such as a current status, may be displayed without requiring selection of a link. The information 106 comprises the activity type, any activity data, and the time the activity was performed. Other mechanisms other than buttons or links may be used. Information other than those listed above may also be displayed.

For example, assume that the web site 100 is part of IBM Video Online™, developed by International Business Machines Corporation™. IBM Video Online is an online video rental application. Users add or remove videos from a wish list 118 displayed in an area of the web site 100 as shown in FIG. 1. As shown in FIG. 1, the wish list 118 includes a first list of items placed in the wish list 118 —i.e., Movie 1 and Movie 2. As the videos on the wish list 118 become available, they are mailed to the user. The user returns the video once it is viewed. Upon receipt of the returned video, the next video on the wish list 118 is mailed to the user.

An example activity for this application is the adding of an item to the user's wish list 118. The activity log 102 would comprise a listing 110 of the activity type, "Added", with the activity data, "Movie 1 to wish list", and the time, "at 9:30 am". The user can view more details of this activity by selecting the "Details" link next to this activity. The addition of Movie 1 to the wish list can be undone by selecting the undo button next to this activity. Once the user performs the addition, the activity log 102 is automatically updated with a display of the listing 110.

Assume that in this example, adding an item to the wish list 118 initiates an asynchronous transaction. When Movie 1 is reserved for the user as part of this asynchronous transaction, the activity log 102 automatically updates by displaying a new listing 112 to inform the user that Movie 1 was reserved at 10:35am. A similar listing can be automatically displayed when Movie 1 is in the process of being packaged for shipping, has been shipped to the user, or has been received back from the user.

Another example activity is the removal of an item from the user's wish list 118. The activity log 102 would comprise a listing 114 of the activity type, "Removed", with the activity data, "Movie 2 from wish list", and the time, "at 9:26am". The user can view more details of this activity by selecting the "Details" link next to this activity. The removal of Movie 2 from the wish list 118 can be undone by selecting the undo button next to this activity. This feature allows the user to view items that have been removed from the wish list 118, even though the wish list 118 itself no longer displays the item. Once the user performs the removal, the activity log 102 is automatically updated with a display of the listing 114.

Another example activity is the changing of the password. The activity log 102 would comprise a listing 116 of the activity type, "Changed", with the activity data, "password", and the time, "at 9:17am". The user can view more details of this activity by selecting the "Details" link next to this activity. The changing of the password can be undone by selecting the undo button next to this activity. This feature informs the user that the password has been changed, even though the password itself does not indicate that the change was made. Once the user performs the change, the activity log 102 is automatically updated with a display of the listing 116.

In this manner, an activity log 102 is displayed in a dedicated area in a business to consumer e-commerce web site 100. The activity log 102 tracks activities that occur during a current e-commerce account session, and is updated automatically, without requiring user intervention. The activity log 102 tracks activities that would conventionally be lost from view, such as the removal of items from a wish list and the changing of a password. In addition, the activity log 102 displays updates that are not conventionally available, such as greater granularity in the status of an asynchronous transaction. In the preferred embodiment, the activity log 102 is always displayed and available to the user in its dedicated area, e.g., separate from the wish list 118 as shown in FIG. 1. However, the user can have the option to display or not display the activity log 102, or to display it in a non-dedicated area, e.g., together with the wish list 118 as shown in FIG. 4.

Figure 2:
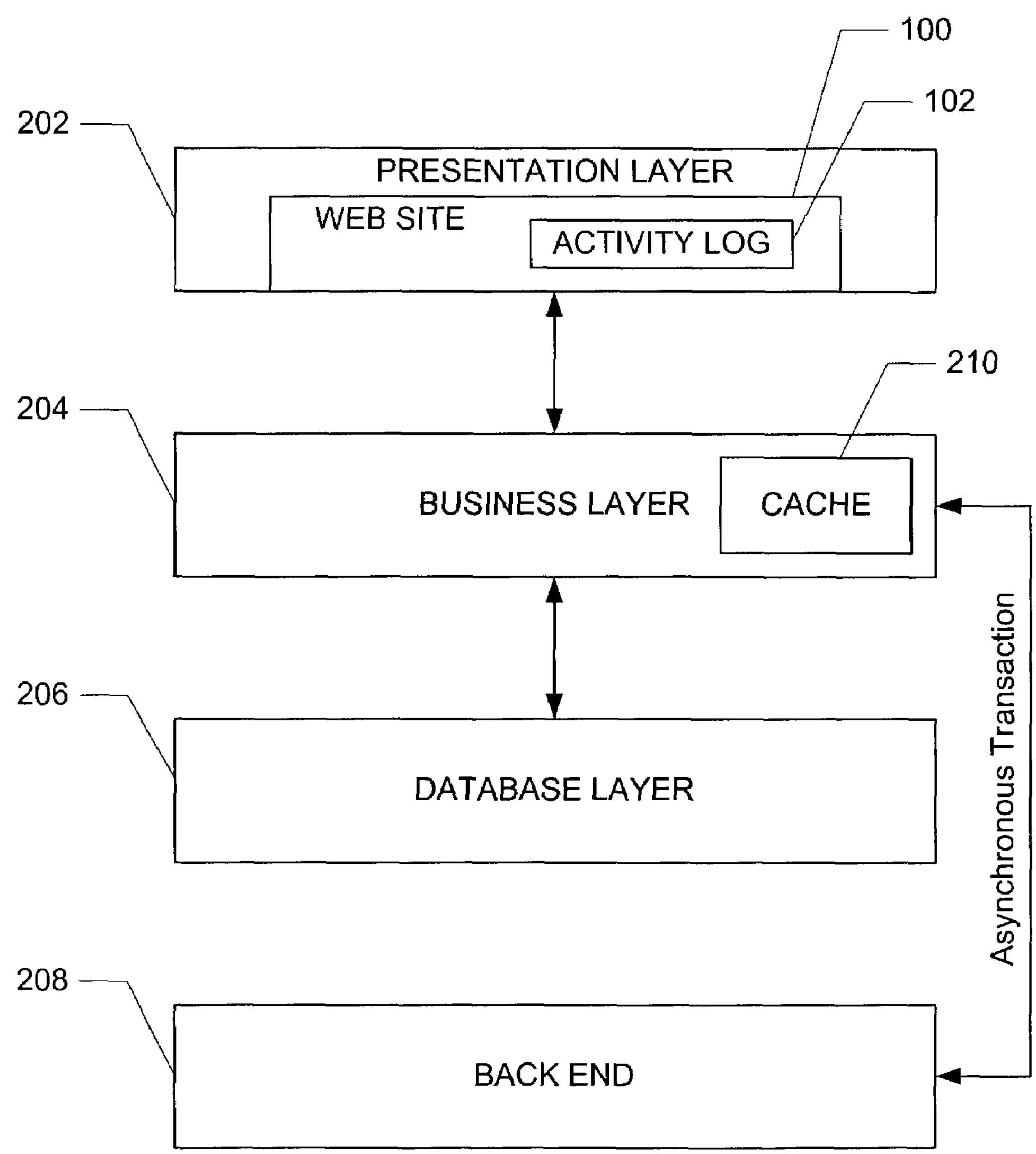
FIG. 2 illustrates a preferred embodiment of a system for displaying activities during a current e-commerce account session in accordance with the present invention.

FIG. 2 illustrates a preferred embodiment of a system for displaying activities during a current e-commerce account session in accordance with the present invention. The system comprises a presentation layer 202, a business layer 204, a database layer 206, and a back end 208. At the presentation layer 202 is the web site 100 comprising the activity log 102. The e-commerce accounts are maintained by the business layer 204. The displaying and updating of the activity log 102 are supported by software at the business layer 204.

In the preferred embodiment, data concerning activities for a current e-commerce account session are stored in a table in the cache 210. Enough data is stored to support the selection of the "Details" link 108 and the undo button 104 for each activity. Optionally, once the current e-commerce account session ends, this data is transferred from the cache 210 to be persistently stored at the database layer 206. This data at the database layer 206 can be accessed during subsequent e-commerce account sessions.

Figure 3:
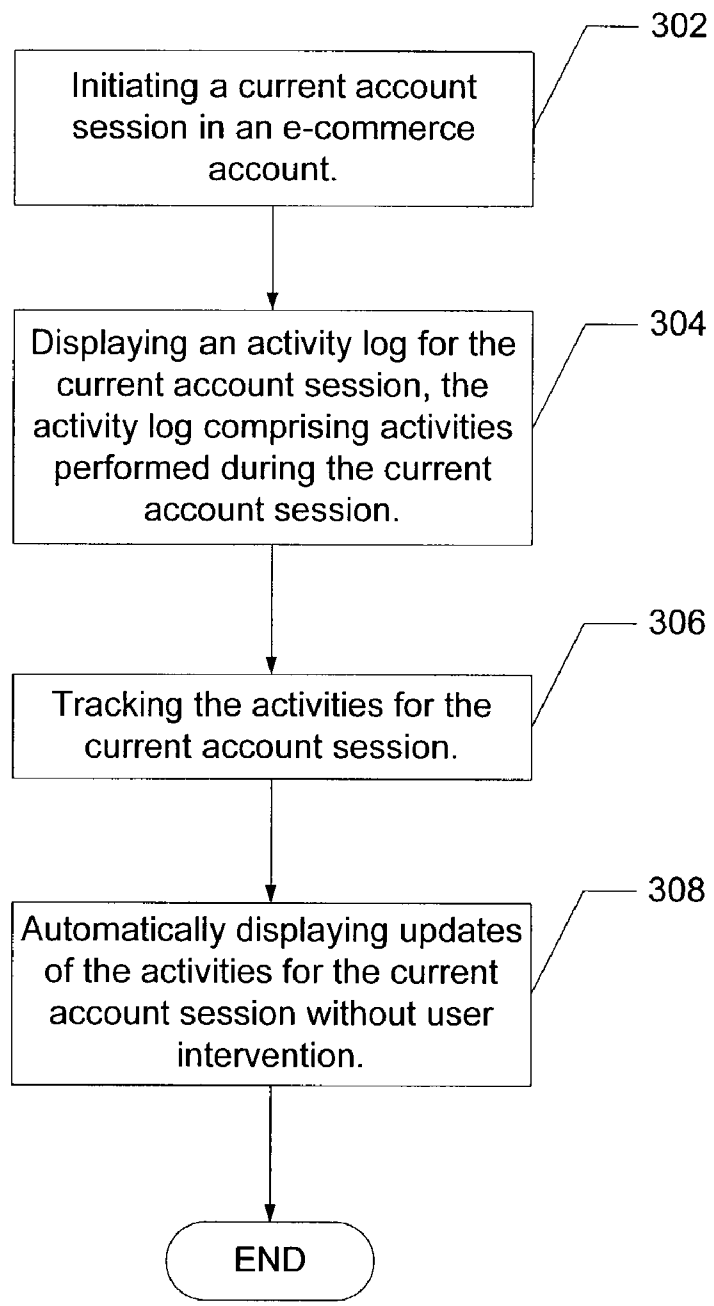
FIG. 3 is a flowchart illustrating a preferred embodiment of a method for displaying activities during a current e-commerce account session in accordance with the present invention.

FIG. 3 is a flowchart illustrating a preferred embodiment of a method for displaying activities during a current e-commerce account session in accordance with the present invention. First, a current account session is initiated in an e-commerce account, via step 302. An activity log 102 is then displayed for the current account session, via step 304. The web site 100 and the activity log 102 are both displayed at the presentation layer 202. The activity log 102 comprises activities that occur during the current account session. These activities are then tracked, via step 306, by the business layer 204. The activities that are tracked include both synchronous and asynchronous transactions. Updates of the activities for the current account session are automatically displayed, without requiring user intervention, via step 308.

For example, the user initiates a current account session for his/her e-commerce account, via step 302, by logging in the user ID and password associated with the account and having them authenticated. The activity log 102 for the current account session is then displayed, via step 304. During the current account session, the user adds Movie 1 to the wish list 118 at 9:30a.m. This addition is received and performed by the business layer 204. The business layer 204 then displays the activity listing 110 in the activity log 102 and stores this activity in its cache 210. The business layer 204 also tracks this activity, via step 306. The business layer 204 initiates an asynchronous transaction with the back end 208, where the user's addition is sent to the appropriate business office. The business office examines its inventory and reserves Movie 1 for the user. The fact that Movie 1 has been reserved is communicated by the back end 208 to the business layer 204. The business layer 204 updates the activity log 102 with the display of the listing 112, via step 308, informing the user of the reservation.

An improved method and system for displaying activities during a current e-commerce account session has been disclosed. The present invention displays an account activity log in a dedicated area in a business to consumer e-commerce web site that tracks activities that occur during a current e-commerce account session. The activity log is updated automatically, without requiring user intervention. The activity log displays information such as the activity type, the activity name, and the time the activity was performed. The activity log may also provide an option for the user to view details about or to undo an individual activity. The activity log tracks activities that would conventionally be lost from view, such as the removal of items from a list displayed in an area on a web site (such as the wish list 118 or a shopping cart as discussed above), and the changing of the password. In addition, the activity log automatically displays updates that are not conventionally available, such as greater granularity in the status of an asynchronous transaction.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer-implemented method for displaying user activities during an e-commerce account session, the method comprising:

receiving user input initiating an e-commerce account session;

displaying a first area on a web site;

receiving user input performing one or more activities during the e-commerce account session including placing an item in the first area or removing an item from the first area, the first area displaying a first list of items placed in the first area; and displaying an activity log on the web site, the activity log including a second list of the one or more activities performed by the user during the e-commerce account session, the second list of the one or more activities performed by the user during the e-commerce account session including a listing corresponding to each item placed in the first area and a listing corresponding to each item removed from the first area.

2. The method of claim 1, wherein displaying a first area on a web site comprises displaying a wish list or displaying a shopping cart.

3. The method of claim 1, wherein the one or more activities performed by the user during the e-commerce account session further includes one or more of ordering an item for purchase or rent, changing a password, rating or reviewing an item, or updating account information associated with the user.

4. The method of claim 1, wherein displaying an activity log on the web site includes, for each activity listed in the second listing of the activity log, displaying one or more of:

an undo button to undo the activity;

an activity type corresponding to the activity;

an activity name corresponding to the activity; or a time the activity was performed by the user.

5. The method of claim 1, wherein displaying an activity log on the web site includes displaying the activity log in a dedicated area on the web site separate from the first area.

6. The method of claim 1, further comprising storing data concerning the one or more activities in a database, the stored data being later accessible by the user during a subsequent e-commerce account session.

* * * * *